United States Patent
Kaushal

(10) Patent No.: US 11,470,390 B2
(45) Date of Patent: Oct. 11, 2022

(54) SYSTEM AND METHOD FOR MEDIA HUB SOFTWARE UPDATING

(71) Applicant: ARRIS ENTERPRISES, LLC, Suwanee, GA (US)

(72) Inventor: Arpan Kumar Kaushal, San Diego, CA (US)

(73) Assignee: ARRIS ENTERPRISES LLC, Suwanee, GA (US)

(*) Notice: Subject to any disclaimer, the term of this patent is extended or adjusted under 35 U.S.C. 154(b) by 0 days.

(21) Appl. No.: 17/343,113

(22) Filed: Jun. 9, 2021

(65) Prior Publication Data
US 2021/0409824 A1 Dec. 30, 2021

Related U.S. Application Data

(60) Provisional application No. 63/046,100, filed on Jun. 30, 2020.

(51) Int. Cl.
*H04N 21/262* (2011.01)
*H04N 21/45* (2011.01)
*H04N 21/443* (2011.01)

(52) U.S. Cl.
CPC ... *H04N 21/4516* (2013.01); *H04N 21/26291* (2013.01); *H04N 21/4435* (2013.01)

(58) Field of Classification Search
None
See application file for complete search history.

(56) References Cited

U.S. PATENT DOCUMENTS

| | | | | |
|---|---|---|---|---|
| 6,092,105 A * | 7/2000 | Goldman | ............... | G06Q 30/04 709/217 |
| 2002/0098864 A1* | 7/2002 | Mukai | ................. | H04B 1/0003 455/552.1 |
| 2002/0104097 A1* | 8/2002 | Jerding | ................... | H04L 69/24 725/115 |
| 2003/0009542 A1* | 1/2003 | Kasai | ................. | H04N 21/4782 725/100 |
| 2003/0032417 A1 | 2/2003 | Minear et al. | | |
| 2007/0050836 A1* | 3/2007 | Stanek | ................. | H04N 21/258 725/74 |
| 2008/0046880 A1 | 2/2008 | Jun et al. | | |

(Continued)

FOREIGN PATENT DOCUMENTS

JP 2004320591 A * 11/2004 ............. H04H 60/31

OTHER PUBLICATIONS

International Search Report and Written Opinion for Application No. PCT/US2021/036590 dated Sep. 15, 2021.

*Primary Examiner* — William J Kim
(74) *Attorney, Agent, or Firm* — Botos Churchill IP Law LLP

(57) ABSTRACT

A system and method for automatically analyzing and managing a media hub software update. The system and method each utilize available media hub system and diagnostic information to aid in the analysis and installation of a software update. If the installation of the update is determined to require memory capacity in excess of what is currently available within the media hub, an archive and off-loading process is automatically initiated to free the required memory space during the installation process. Any off-loaded information and/or applications are then restored after the installation is complete.

24 Claims, 3 Drawing Sheets

(56) References Cited

U.S. PATENT DOCUMENTS

| | | | |
|---|---|---|---|
| 2008/0066130 A1* | 3/2008 | Elbarky | H04N 21/4622 348/E7.071 |
| 2010/0054327 A1* | 3/2010 | Capless | H04N 21/658 375/240.01 |
| 2010/0058421 A1* | 3/2010 | Hastings | H04N 21/8166 725/132 |
| 2010/0165808 A1* | 7/2010 | Harada | G11B 27/034 |
| 2011/0055889 A1* | 3/2011 | Neill | H04N 21/8166 725/132 |
| 2011/0072481 A1 | 3/2011 | Chen | |
| 2011/0099228 A1* | 4/2011 | Smith | H04N 21/632 711/159 |
| 2014/0006951 A1* | 1/2014 | Hunter | H04N 21/8166 715/719 |
| 2016/0357545 A1* | 12/2016 | Linn | G06F 8/65 |
| 2017/0177321 A1* | 6/2017 | Seastrom | H04N 21/4432 |
| 2018/0081887 A1* | 3/2018 | Ahn | G06F 16/164 |
| 2018/0275908 A1* | 9/2018 | Anderes | G06F 9/5061 |

\* cited by examiner

SYSTEM AND METHOD FOR MEDIA HUB SOFTWARE UPDATING

CROSS-REFERENCE TO RELATED APPLICATION

This application claims the benefit of U.S. Provisional Patent Application No. 63/046,100, filed Jun. 30, 2020, which is incorporated by reference herein in its entirety.

BACKGROUND OF THE INVENTION

More than ever, consumers are utilizing media hubs, such as set-top boxes, to receive and consume media and information. These media hubs are typically provided by or leased from content providers such as telecom providers, cable companies or other such head-end operators (collectively referred to as "multiple-system operators" or "MSOs"). The media hubs are subject to periodic MSO-mandated software updates that are initiated and managed by the MSO via a network connection to the hub. Such updates are typically required to maintain the media hubs compatibility with the MSO's network, enable new features and services, or simply provide a channel update.

The process of updating a media hub is ideally transparent to, or at least minimally disruptive for, a consumer. The new, updated software would be downloaded and installed upon the media hub without an interruption in service and without the consumer having to take any action or otherwise intervene. A smooth and reliable media hub updating process is also of significant value to the MSO. An MSO wants updates to proceed across a network in an efficient and seamless manner so as to ensure that the population of connected media hubs are all running the latest software as soon as possible, thereby minimizing possible network anomalies and problems. Additionally, having a seamless process also likely minimizes complaints to the MSO from consumers.

Unfortunately, that is not always the case. Media hubs are at their core digital computers subject to the limitations of their processing and memory systems. For example, memory management within a media hub can prove a daunting problem when a mandated software update is to be installed. This is particularly evident in media hubs utilizing Google's Android™ operating system. Some implementations of the Android operating system within media hubs fail to automatically reserve memory space within the media hub for software updates, and are not adapted to automatically handle a condition where a downloaded software update would exceed the available capacity of the media hub's memory. This leads to a situation requiring intervention by a consumer or an MSO technician to properly configure the media hub in order to successfully download and install an update; an undesirable situation for all parties involved. Consequently, there exists a need for a system and method whereby a networked media hub can seamlessly accept, manage and install a mandated software update without the intervention of a consumer or a technician.

BRIEF SUMMARY OF THE INVENTION

A system and method for automatically analyzing and managing a media hub software update. The system and method each utilize available media hub system and diagnostic information to aid in the analysis and installation of a software update. If the installation of the update is determined to require memory capacity in excess of what is currently available within the media hub, an archive and off-loading process is automatically initiated to free the required memory space during the installation process. Any off-loaded information and/or applications are then restored after the installation is complete.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
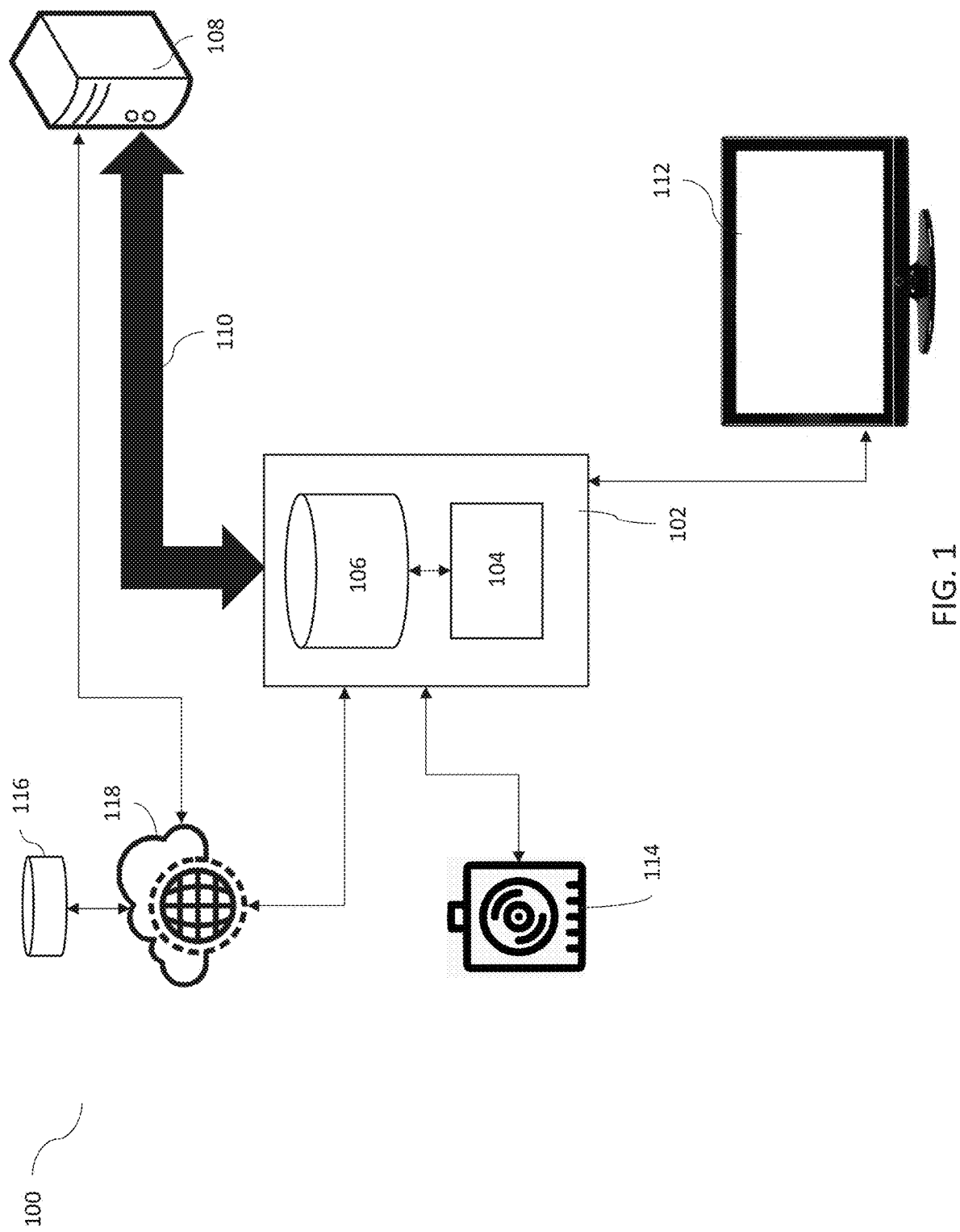
FIG. 1 is a functional diagram depicting a media hub system supporting a preferred embodiment of a system and method for automatically analyzing and managing a media hub software update.

FIG. 1 is a functional diagram of a preferred media hub system supporting the automatically analyzing and managing a media hub software update. As shown, system 100 comprises media hub 102. Media hub 102 includes processor 104 and memory 206. Memory 206 stores information that defines an operating system and one or more applications, as well as content data. Media hub 102 is linked to headend 108 by broadband network 110. Headend 108 is controlled by an MSO that provides media services and content to the users of media hub 102. Media hub 102 is also shown to be linked to television 112, upon which users can access MSO provided media services.

Figure 2:
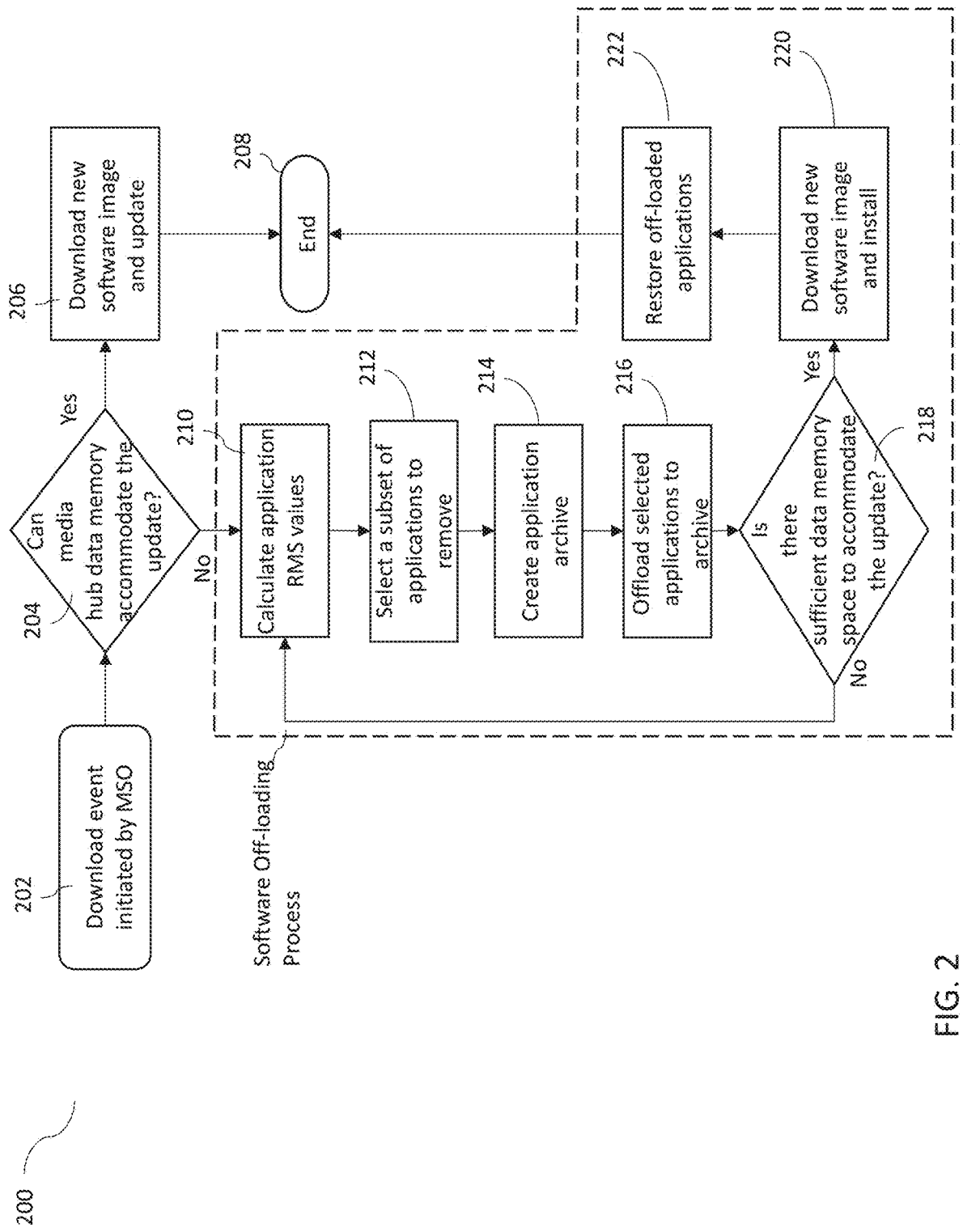
FIG. 2 is a diagram of a first preferred process flow for automatically analyzing and managing a media hub software update of a centralized access and management system.

A flow diagram showing the steps involved in an MSO mandated software update for media hub 102 in FIG. 2. The process the MSO initiates the process by triggering or scheduling a software download event for media hub 102 (step 202). The event begins with a query of memory 106 by processor 104 to determine if the memory presently has enough free storage space to accommodate the impending software update download (step 204). Information indicative of the storage space required for the download would have been provided to media hub 102 by headend 108 at the initiation of the download event. If memory 206 has the requisite available storage space, the process continues with step 206 and the image of the updated software is downloaded to media hub 102 from headend 108. The process then terminates at step 208 with media hub 102 fully updated.

However, if conditional step 204 results in a negative outcome, the process of software off-loading is initiated within media hub 102. In step 210 processor 104 calculates the value of a Relative Move Score ("RMS") for each application presently stored in memory 106. This RMS value is a function of the total memory footprint a given application occupies within memory 106. The more memory occupied, the higher the calculated RMS value. The calculated RMS value for an application will be reduced by processor 104 if the MSO has designated that particular application as high-priority. This type of designation might be applied by an MSO to applications central to the operation of video services, or those related to content management and customer privacy. Regardless of motive for designating an application "high-priority", the associated RMS for that application will be reduced. This reduction can be a percentage of the actual calculated RMS, or simply fixing the value of the RMS to a predetermined value or limit. For extremely high-priority applications RMS could be fixed at 0.

Once the RMS values for all of the applications stored in memory 106 have been calculated and all reductions applied, processor 104 selects a subset that will be temporarily removed from memory 104 (step 212). This subset can be specified within the software off-loading process to be a predetermined number of applications (remove the three applications having the highest RMS value), or predetermined percentage of the number of applications stored in memory 106 (remove stored applications according to RMS values until 30% of the memory space occupied by applications is free). The particular algorithm applied to determine the manner in which applications will be removed can be arbitrarily defined by the MSO, but it must prioritize the removal of applications having higher relative RMS values to ensure the off-loading process is performed efficiently.

The process continues with step 214 wherein a processor creates an application archive for the storage of the applications that will be temporarily removed. This application archive can be a portion of an external hard drive (114) or cloud-based storage (116) linked to media hub by a private or public network (118). The selected subset of applications is then off-loaded from media hub 102 to the archive (step 218).

Next processor 102 determines if the off-loading of the selected subset of applications has resulted in clearing enough free space within memory 106 to accommodate the downloading of the updated software (step 218). If it has, the process continues with step 220 and the new software image is downloaded and installed on media hub 102. The off-loaded applications are then restored onto media hub 102 from the archive (step 222) and the process terminates (step 208). However, if conditional 218 has a negative outcome, the process reverts back to step 210 and RMS values are recalculated for the applications that remain within memory 106. Steps 212-218 are then repeated until the downloading of the updated software can be accommodated.

Figure 3:
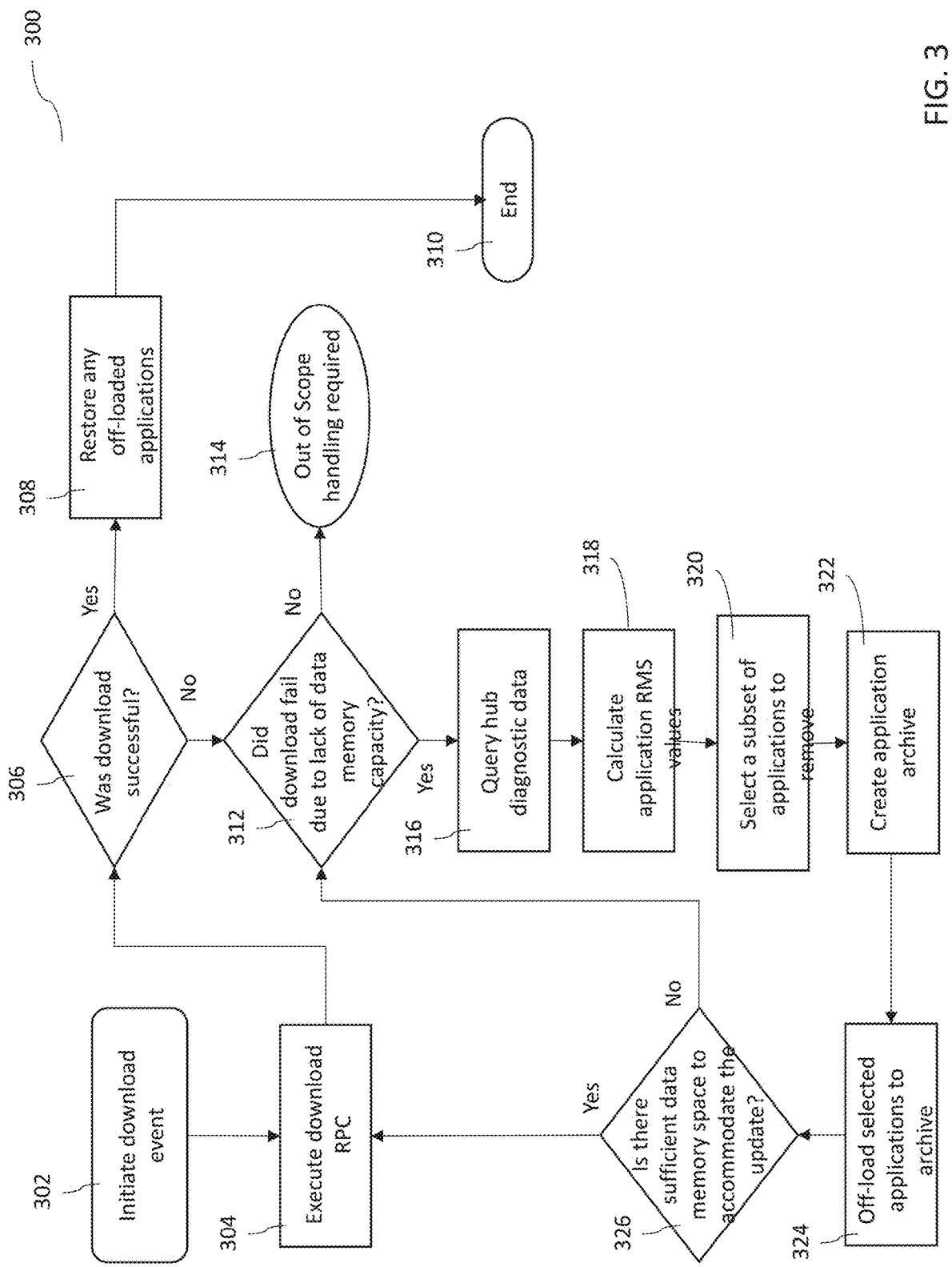
FIG. 3 is a diagram of an alternate preferred process flow for automatically analyzing and managing a media hub software update of a centralized access and management system.

A flow diagram for an alternate process of automatically analyzing and managing a media hub software update is depicted in FIG. 3. This alternate process relies upon the headend, as opposed to a media hub processor, to primarily direct and manage the process. As shown in FIG. 3, the process is started at step 302 with the headend initiating a download event and executing a Remote Procedure Call ("RPC") to download the updated software to media hub 102 (step 304). If the download was successful, any off-loaded applications are restored to memory 106 (step 308) the process terminates (steps 310).

However, if conditional step 306 results in a negative outcome, the headend determines if an "out of memory" error message was generated by media hub 102 (step 312). If a such an error message was not generated, headend 108 designates the download as requiring attention that is outside of the scope of the headend capabilities. An out of scope determination may result in the MSO dispatching a technician to the premises at which media hub 102 is installed, or initiating some other action to remediate the situation.

If conditional 312 results in an affirmative outcome, the process continues with step 316 and the headend accesses diagnostic information collected by and stored within media hub 102. Diagnostic information is routinely accumulated within media hubs in accordance with various technical specifications, such as those established by the Broadband Forum (see Broadband Forum Technical Reports 069 and 181). Utilizing this diagnostic information, the RMS value for each application presently stored in memory 106 is calculated at the headend (step 318). The calculated RMS value is then utilized to select a subset of applications to be temporarily removed from memory 104 (step 320). This subset can be determined in much the same manner as was described for the process flow of FIG. 2 and the process will not be discussed further here.

The process continues with step 322 wherein the headend creates an application archive for the storage of the applications that will be temporarily removed. This application archive can be located within the headend, or within a portion of an external hard drive (114), or cloud-based storage (116) linked to media hub 102 or headend 108 by a private or public network (118). The selected subset of applications is then off-loaded from media hub 102 to the archive (step 324).

Next headend 108 determines if the off-loading of the selected subset of applications has resulted in clearing enough free space within memory 106 to accommodate the downloading of the updated software (step 326). This determination is made based upon diagnostic data obtained from media hub 102. If it has, the process continues with step 304 and an RPC is initiated to download the new software image and install it on media hub 102. The process then continues as was outlined above (step 306, . . . ).

Although the invention herein has been described with reference to particular embodiments, it is to be understood that these embodiments are merely illustrative of the principles and applications of the present invention. Variations and extensions could be implemented and practiced without departing from the spirit and scope of the present invention as defined by the appended claims.

The invention claimed is:

1. A system for the management of media hub software downloading, the system comprising:
 a headend adapted to provide at least one software image, wherein a predetermined amount of memory is required at a download location to facilitate the storage and installation of the at least one software image; and
 a media hub, comprising at least one processor and at least one local memory, wherein:
  the at least one local memory stores data associated with a plurality of applications and information indicative of the amount of memory occupied by each subset of data associated with a particular one of the plurality of applications; and
  the at least one processor is adapted to:
   determine, based at least in part on information received from the headend, that the free space within the at least one local memory is insufficient to facilitate the storage and installation of the at least one software image;
   calculate a relative move score value for each of the plurality of applications based upon the total memory footprint occupied by each application within the at least one local memory, wherein the magnitude of the relative move score value increases as the total memory footprint increases;
   select a subset of applications to be removed from the at least one local memory based upon the calculated relative move score values;
   designate an archive memory, exclusive of the at least one local memory, having a capacity greater than or equal to the aggregate memory footprint of the selected applications;

off-load the selected applications to the designated archive memory;

receive the at least one software image from the headend;

install the received at least one software image within the at least one local memory; and restore the off-loaded subset of applications to the at least one local memory from the designated archive memory.

2. The system of claim 1 wherein the media hub is a set-top box.

3. The system of claim 1 wherein the designated archive memory comprises at least one of the following:

a hard drive memory co-located with media hub; and a memory linked to the media hub by a network.

4. The system of claim 1 wherein the subset of applications comprises a predetermined number of applications, the selection of which is based, at least in part, on the calculated relative move score values.

5. The system of claim 1 wherein the subset of applications comprises a predetermined percentage of the aggregate number of applications, the selection of which is based, at least in part, on the calculated relative move score values.

6. The system of claim 1 wherein the relative move score for at one of the plurality of applications is reduced as a function of a priority designation associated with the at least one of the plurality of applications.

7. A system for the management of media hub software downloading, the system comprising:

a media hub, comprising at least one processor and at least one local memory, wherein:

the at least one local memory stores data associated with a plurality of applications and information indicative of the total memory footprint occupied by each subset of data associated with a particular one of the plurality of applications and information indicative of the amount of free memory available within the at least one local memory; and a headend adapted to:

provide at least one software image to the media hub, wherein a predetermined amount of memory is required at a download location to facilitate the storage and installation of the at least one software image;

determine, based at least in part on information stored in the at least one local memory of the media hub, that the free space within the at least one local memory is insufficient to facilitate the storage and installation of the at least one software image;

calculate, based at least in part on information stored in the at least one local memory of the media hub and indicative of the total memory footprint within the at least one local memory occupied by each subset of data associated with a particular one of the plurality of applications, a relative move score value for each of the plurality of applications;

select a subset of applications to be removed from the at least one local memory based upon the calculated relative move score values;

designate an archive memory, exclusive of the at least one local memory, having a capacity greater than or equal to the aggregate memory footprint of the selected applications, wherein the magnitude of the relative move score value increases as the total memory footprint increases;

instruct the at least one processor to off-load the selected applications to the designated archive memory;

provide the at least one software image to the media hub;

instruct the at least one processor to install the provided at least one software image within the at least one local memory; and instruct the at least one processor to restore the off-loaded subset of applications to the at least one local memory from the designated archive memory.

8. The system of claim 7 wherein the media hub is a set-top box.

9. The system of claim 7 wherein the designated archive memory comprises at least one of the following:

a hard drive memory co-located with media hub; and a memory linked to the media hub by a network.

10. The system of claim 7 wherein the subset of applications comprises a predetermined number of applications, the selection of which is based, at least in part, on the calculated relative move score values.

11. The system of claim 7 wherein the subset of applications comprises a predetermined percentage of the aggregate number of applications, the selection of which is based, at least in part, on the calculated relative move score values.

12. The system of claim 7 wherein the relative move score for at one of the plurality of applications is reduced as a function of a priority designation associated with the at least one of the plurality of applications.

13. A method for the management of media hub software downloading in a system comprising:

a headend adapted to provide at least one software image, wherein a predetermined amount of memory is required at a download location to facilitate the storage and installation of the at least one software image; and a media hub, comprising at least one processor and at least one local memory, wherein:

the at least one local memory stores data associated with a plurality of applications and information indicative of the amount of memory occupied by each subset of data associated with a particular one of the plurality of applications;

the method comprising the steps of:

determining, based at least in part on information received from the headend, that the free space within the at least one local memory is insufficient to facilitate the storage and installation of the at least one software image;

calculating a relative move score value for each of the plurality of applications based upon the total memory footprint occupied by each application within the at least one local memory, wherein the magnitude of the relative move score value increases as the total memory footprint increases;

selecting a subset of applications to be removed from the at least one local memory based upon the calculated relative move score values;

designating an archive memory, exclusive of the at least one local memory, having a capacity greater than or equal to the aggregate memory footprint of the selected applications;

off-loading the selected applications to the designated archive memory;

receiving the at least one software image from the headend;

installing the received at least one software image within the at least one local memory; and restoring the off-loaded subset of applications to the at least one local memory from the designated archive memory.

14. The method of claim 13 wherein the media hub is a set-top box.

15. The method of claim 13 wherein the designated archive memory comprises at least one of the following:
a hard drive memory co-located with media hub; and
a memory linked to the media hub by a network.

16. The method of claim 13 wherein the subset of applications comprises a predetermined number of applications, the selection of which is based, at least in part, on the calculated relative move score values.

17. The method of claim 13 wherein the subset of applications comprises a predetermined percentage of the aggregate number of applications, the selection of which is based, at least in part, on the calculated relative move score values.

18. The system of claim 13 wherein the relative move score for at one of the plurality of applications is reduced as a function of a priority designation associated with the at least one of the plurality of applications.

19. A method for the management of media hub software downloading in a system comprising:
a media hub, comprising at least one processor and at least one local memory, wherein:
the at least one local memory stores data associated with a plurality of applications and information indicative of the total memory footprint occupied by each subset of data associated with a particular one of the plurality of applications and information indicative of the amount of free memory available within the at least one local memory; and
a headend adapted;
the method comprising the steps of:
providing at least one software image to the media hub, wherein a predetermined amount of memory is required at a download location to facilitate the storage and installation of the at least one software image;
determining, based at least in part on information stored in the at least one local memory of the media hub, that the free space within the at least one local memory is insufficient to facilitate the storage and installation of the at least one software image;
calculating, based at least in part on information stored in the at least one local memory of the media hub and indicative of the total memory footprint within the at least one local memory occupied by each subset of data associated with a particular one of the plurality of applications, a relative move score value for each of the plurality of applications, wherein the magnitude of the relative move score value increases as the total memory footprint increases;
selecting a subset of applications to be removed from the at least one local memory based upon the calculated relative move score values;
designating an archive memory, exclusive of the at least one local memory, having a capacity greater than or equal to the aggregate memory footprint of the selected applications;
instructing the at least one processor to off-load the selected applications to the designated archive memory;
providing the at least one software image to the media hub;
instructing the at least one processor to install the provided at least one software image within the at least one local memory; and
instructing the at least one processor to restore the off-loaded subset of applications to the at least one local memory from the designated archive memory.

20. The method of claim 19 wherein the media hub is a set-top box.

21. The method of claim 19 wherein the designated archive memory comprises at least one of the following:
a hard drive memory co-located with media hub; and
a memory linked to the media hub by a network.

22. The method of claim 19 wherein the subset of applications comprises a predetermined number of applications, the selection of which is based, at least in part, on the calculated relative move score values.

23. The method of claim 19 wherein the subset of applications comprises a predetermined percentage of the aggregate number of applications, the selection of which is based, at least in part, on the calculated relative move score values.

24. The system of claim 19 wherein the relative move score for at one of the plurality of applications is reduced as a function of a priority designation associated with the at least one of the plurality of applications.

* * * * *